United States Patent [19]
Krause

[11] Patent Number: 6,045,166
[45] Date of Patent: Apr. 4, 2000

[54] HIGH PRESSURE PLUG/PORT ASSEMBLY

[75] Inventor: Richard K. Krause, Wooster, Ohio

[73] Assignee: The RexRoth Corporation, Wooster, Ohio

[21] Appl. No.: 09/126,965

[22] Filed: Jul. 31, 1998

[51] Int. Cl.$^7$ .................................................. G01K 1/08
[52] U.S. Cl. ..................... 285/347; 285/220; 285/918; 285/379
[58] Field of Search .................... 285/347, 220, 285/349, 350, 918, 379; 374/148, 208

[56] References Cited

U.S. PATENT DOCUMENTS

| | | | |
|---|---|---|---|
| 2,661,965 | 12/1953 | Parmesan | 285/347 |
| 3,240,515 | 3/1966 | Schmohl | 285/220 |
| 3,376,053 | 4/1968 | Novakovich et al. | 285/347 |
| 4,768,560 | 9/1988 | Logsdon . | |
| 4,822,080 | 4/1989 | Darish . | |
| 4,934,742 | 6/1990 | Williamson | 285/220 |
| 5,110,160 | 5/1992 | Brozovic . | |
| 5,115,550 | 5/1992 | Williamson . | |
| 5,165,731 | 11/1992 | Kimuta | 285/220 |
| 5,217,236 | 6/1993 | Kitamura | 285/918 |
| 5,291,842 | 3/1994 | Sallstrom et al. | 285/220 |
| 5,433,489 | 7/1995 | Kimura et al. | 285/220 |
| 5,667,305 | 9/1997 | Walker . | |
| 5,676,174 | 10/1997 | Berneski, Jr. et al. . | |

*Primary Examiner*—Eric K. Nicholson
*Attorney, Agent, or Firm*—Frank J. Nawalanic

[57] ABSTRACT

A high pressure plug/port assembly includes a plug having a head portion at one end, a guide portion at the other end and an O-ring portion therebetween. An annular plug seat surface extends radially inward from the head portion to the O-ring portion at the intersection thereof and a chamfered surface extends radially outward from the O-ring portion to the guide portion at the intersection thereof. The port includes a threaded counterbore in threaded engagement with the plug head portion, a smaller bore receiving the plug's guide portion and a frusto conical bore extending from the smaller bore to the counterbore and defining an annular port seat surface extending radially outward from the frusto conical bore to the counterbore. The seat surfaces provide an undistorting, annular sealing area isolating the threaded connection from high-pressure fluid while the frusto conical bore and plug configuration compresses an O-ring seal in the O-ring portion into sealing engagement with high pressure fluid in the smaller bore.

4 Claims, 3 Drawing Sheets

HIGH PRESSURE PLUG/PORT ASSEMBLY

This invention relates to a threaded plug and more particularly to the combination of a plug with a port for high pressure, hydraulic environments.

The invention is particularly applicable to a HEUI (hydraulically actuated electronically controlled unit injector) fuel system having pumps, reservoirs and accumulators with aluminum housings containing drilled or cored passages inter-connected with one another for conveying hydraulic fluid at high pressure which must be plugged or closed and will be described with reference to such environment. However, those skilled in the art will recognize that the invention has broader applications and may be used wherever a high pressure port is to be sealed or closed with a threaded plug.

BACKGROUND

Hydraulic passages have traditionally been closed off or plugged by means of either a pipe plug or a JIC (SAE) type plug.

In high pressure applications, the use of "traditional" plugs can present potential problems. Among such problems are the wedge effect of a tapered type plug inserted into a tapered threaded port which induce stresses into the components when tightened. Additionally, the threads of the pipe plug port are exposed to high pressures causing additional stresses to the components. Further, potential leakage at the location of a pipe plug requires the use of a liquid sealant or Teflon tape to insure that the plug/port is leak free. An alternative to the pipe plug is the SAE type plug. This traditional type of plug has straight threads which eliminates the assembly stresses of the pipe plug. It affects sealing by an O-ring in a counter bore in the port above the threads which is compressed by the head of the plug. This arrangement does not alleviate stresses on the threads attributed to fluid pressure.

When a traditional plug is threaded into sealing engagement with a port formed in a softer aluminum housing to seal a passage at high fluid pressure, the additional stresses placed on the threads resulting from the high pressure of the fluid can cause a failure in the softer aluminum threads and result in leakage. In addition, the stresses exerted by a tapered plug on the aluminum housing can physically distort the housing and can cause housing failures. The housing stresses are aggravated in the HEUI application because of adverse temperature effects attributed to engine and fluid heat.

The prior art has recognized the shortcomings attributed to traditional plug/port assemblies and has positioned the seal beneath the threads. In U.S. Pat. No. 5,110,160 to Brozovic, a high pressure coupling is illustrated in FIG. 1 in which a frusto conical metal-to-metal seating surface 1 is sealed by means of O-ring 2. This alleviates the pressure of the fluid acting on the threads of the fitting while reducing the area over which the fluid acts. This prior art sealing arrangement illustrated in FIG. 1 is applied to a prior art plug made available by the assignee of this invention as shown in FIG. 3. Again, frusto conical area 1 provides a metal-to-metal seat for sealing by O-ring 2 in FIG. 3. The frusto conical seating surface is a small area which produces an angular force or stress throughout the housing body containing the port. When the housing is made of a softer material such as encountered in a HEUI application, the housing is adversely stressed and could become distorted if the plug was over torqued.

In FIG. 2 there is illustrated a gas temperature sensor disclosed in U.S. Pat. No. 5,667,305 to Walker. In the sensor of FIG. 2, an elastomer seal 2 is likewise positioned downstream of the threaded engagement to seal a smaller diameter bore 3. The arrangement in FIG. 2, like the prior art illustrated in FIGS. 1 and 3 reduces the sealing area and thus the force attributed to the fluid which would otherwise act on the threaded connection. The seal in FIG. 2 is radially compressed.

SUMMARY OF THE INVENTION

It is thus a principle object of the invention to provide a sealed, high pressure, hydraulic plug/port assembly which can be applied in a housing of softer material than that of the plug without unduly stressing the housing or the threaded engagement between the plug and the port.

This object along with other features and advantages of the invention is achieved in a high pressure plug/port assembly which includes a cylindrical plug longitudinally extending between a head end and a guide end. The plug has a head portion extending from the head end, a guide portion extending from the guide end and an O-ring portion therebetween. The head portion has external threads over a section thereof and the O-ring portion is smaller in diameter than the head and guide portions while the guide portion is smaller in diameter than the head portion. The intersection of the head and O-ring portions defines an annular plug seat which extends radially outward from the O-ring portion and the intersection of the guide portion and the O-ring portion defines a chamfered surface which opens radially outward from the O-ring portion. The high pressure port is formed in a housing having a flat external surface adjacent the plug's head end with a threaded counterbore longitudinally extending in the housing from the flat surface in threaded engagement with the head portion of the plug and terminating at an annular port seat surface which extends radially inward. A smaller bore of diameter approximately equal to the plug's guide portion is concentric with the counterbore and a frusto conical bore having a major diameter adjacent the port seat and a minor diameter adjacent the smaller bore connects the smaller bore with the counterbore. A sealing arrangement is provided for sealing the port by the plug and includes i) an O-ring which is radially compressed between the frusto conical port surface and the plug O-ring portion and longitudinally compressed between the port frusto conical surface, the plug seating surface and the chamfered opening and ii) the plug and port seating surfaces are in metal-to-metal sealing contact with one another whereby the O-ring principally functions to prevent fluid from reaching the seat surfaces while the annular seat surfaces seal the pressure attributed to the high-pressure fluid effectively isolating the threaded connections from the high-pressure fluid.

In accordance with another important feature of the invention, the annular seating surfaces are perpendicular to the cylindrical plug and to the longitudinal centerline of the bore and are placed only in compression when the plug is torqued to rated load thereby minimizing distortion of the housing while also maintaining the seated surfaces sealed about their circumferential area notwithstanding temperature and pressure variations.

It is thus an object of the invention to provide a high pressure hydraulic fluid plug/port assembly which utilizes relatively large annular seating surfaces generally perpendicular to the longitudinal access of the plug to dissipate assembly forces without deforming the port when the port is made of a softer material than the plug if the plug is over torqued.

Still yet another important object of the invention is to provide in the aforementioned plug/port assembly an arrangement for positively sealing the seat area as described by means of an elastomer seal or O-ring which is positively compressed in both a radial and longitudinal manner by the assembly.

Still yet another important object of the invention is to provide in the combination of a plug and a port, a seal arrangement beneath the threaded connection acting over a smaller area of the plug than that of traditional plug/port assemblies whereby the force exerted by the fluid on the plug is reduced so that the plug and port combination can withstand fluids at higher pressures than otherwise possible.

It is yet another object of the invention to provide a high pressure port/plug assembly which alleviates pressure applied to the screw threads so that a plug of a smaller diameter under pressure can be made for sealing a port at the same pressure as would be required with plug/port assemblies of traditional taper plug or SAE fitting designs.

Still yet another object of the invention is to provide a simple and economical plug/port assembly.

These object and other features of the present invention will become apparent from the following Description of the Invention taken together with the accompanying drawings.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF THE INVENTION

Figure 4:
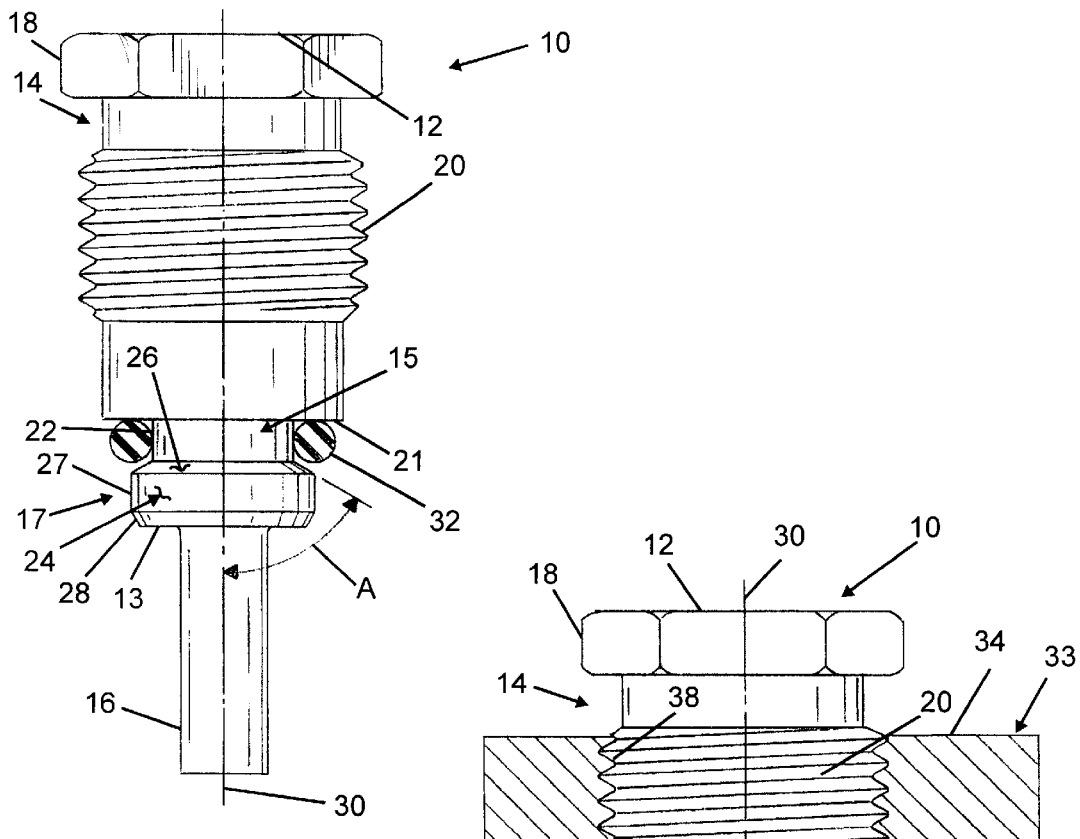
FIG. 4 is a longitudinal view of the plug of the present invention.

Referring now to the drawings wherein the showings are for the purpose of illustrating a preferred embodiment invention only and not for the purpose of limiting the same, there is shown in FIG. 4 a plug 10 of the present invention. Plug 10 extends from a head end 12 to a guide end 13. Extending from head end 12 is a head portion 14 which longitudinally extends to and terminates at an O-ring portion 15 contiguous therewith. O-ring portion 15 longitudinally extends to and terminates at guide portion 17 which is contiguous therewith and guide portion 17 extends to guide end 13. Plug 10 and its portions 14, 15 and 17 are cylindrically concentric with and longitudinally extend along centerline 30. For plug 10 illustrated in FIGS. 4 and 5, there is an optional spacer section 16 extending from guide end 13 for purposes explained below.

Head portion 14 includes a fastener section 18 adjacent head end 12 shown in the form of a conventional hex shaped nut. An externally threaded section 20 extends over the central area of head portion 14. Threaded section 20 is a straight thread and in the preferred embodiment is a UNF thread. Head portion 14 terminates at an annular seat surface 21 which extends radially inward until intersecting a cylindrical surface 22 of O-ring portion 15.

Guide portion 17 includes a cylindrical guide seat section 24. Guide seat section 24 is larger in diameter than O-ring cylindrical surface 22 and a chamfered surface 26 extends radially inward from a cylindrical guide seat surface 27 and intersects with O-ring cylindrical surface 22.

In the preferred embodiment, chamfered surface 26 forms an angle designated as "A" in FIG. 4 of 60° with longitudinal centerline 30. The angle formed at an entrance chamfered surface 28 on the opposite side of cylindrical guide seat surface 27 forms an angle of 30° with longitudinal centerline 30. As will be explained in more detail below, relative dimensioning of certain components of the plug/port assembly of the invention is critical to the sealing function of the device. In the preferred embodiment, angle A is set at 60°. However, depending on dimensioning, angle A could vary anywhere from about 45° to 60°. Additionally, it should be noted that annular seat surface 21 is perpendicular to centerline 30 and O-ring cylindrical surface 22.

An O-ring seal 32 fits about O-ring portion 15. In the unassembled position shown in FIG. 4, seal 32 is stretched over guide seat section 24 and is retained by chamfered surface 26 and annular seat surface 21. In the preferred embodiment, O-ring 32 is specified as being Parker compound V894-90 or equivalent. In the preferred embodiment, plug 10 is formed of a free cutting steel such as 12L14 steel which, in the HEUI application, is zinc coated to specifications, such as ASTMB633 or SAEJ514 requirements for hydraulic tube fittings. As noted above, steel plug 10 was initially designed for application to an aluminum housing such as an HEUI pump cast aluminum housing having port passages at high hydraulic pressures. High hydraulic pressure means fluid pressures in excess of 4,000 psi. Current tests have demonstrated that the plug/port assembly of the invention can withstand hydraulic pressure in excess of 4,500 psi.

Figure 5:
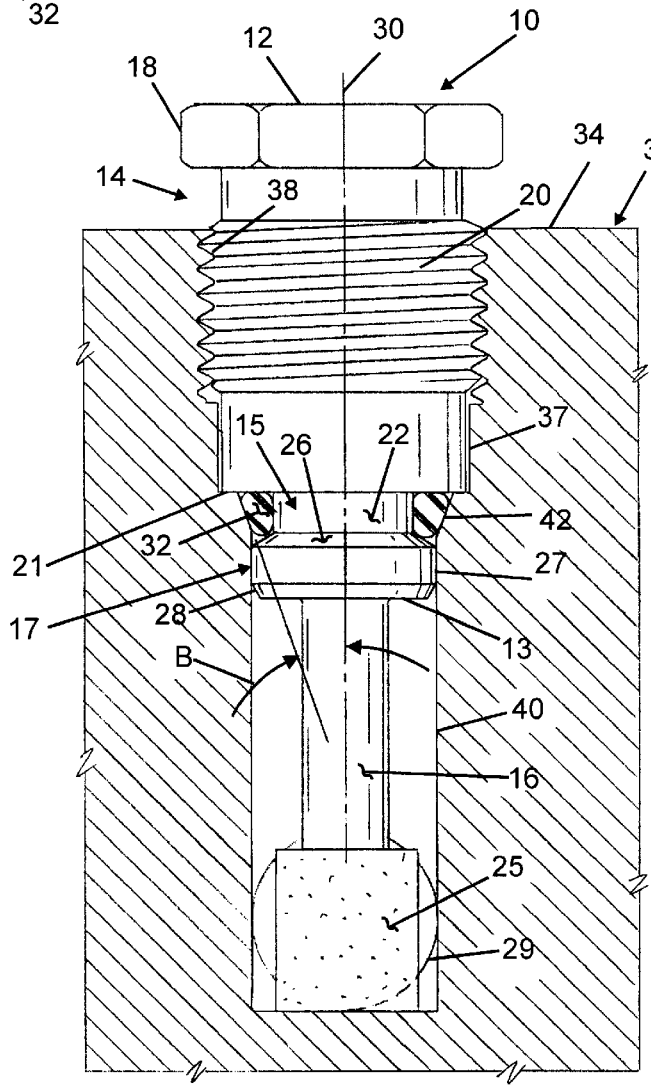
FIG. 5 is a partially sectioned view of the plug/port assembly of the present invention; and, FIG. 6 is an expanded view of the seal arrangement of the plug/port assembly of the present invention.

Referring now to FIG. 5, there is shown the plug/port combination or assembly of plug 10 into a configured port formed in a housing 33. Housing 33 has an exterior surface 34 opening to a counterbore 37 formed in housing 33 and internally threaded at 38 to establish a threaded connection with threaded section 20 of plug 10 as shown. A smaller diameter bore 40 is longitudinally spaced from and in fluid communication with counterbore 37 by means of a frusto conical bore 42. Frusto conical bore 42 is defined by a minor diameter 43 which is equal to the diameter of the smaller bore 40 and a major diameter 44 which defines the inner diameter of an annular port seat surface 45 which in turn extends radially outward to the diameter of counterbore 37. Counterbore 37, frusto conical bore 42 and smaller diameter bore 40 are concentric with plug centerline 30.

Frusto conical bore 42 forms an angular relationship shown as B in FIG. 5 of about 20° with longitudinally extending centerline 30 although angular relationships of anywhere from about 10° to 30° and preferably of about 12° to 15° are believed acceptable. With respect to the angular dimensions, obviously by sizing diameters the dimensions can vary. Plug 10 is sized in accordance with conventional SAE plug/fitting sizes. Thus, plug diameter for head portion 14 is sized at an SAE plug size, while O-ring portion 15 is sized for a standard SAE O-ring, such as one size less than the "TRADITIONAL" O-ring size for head portion 14. The angular relationships are based on standard SAE plug or fitting sizes.

Figure 6:
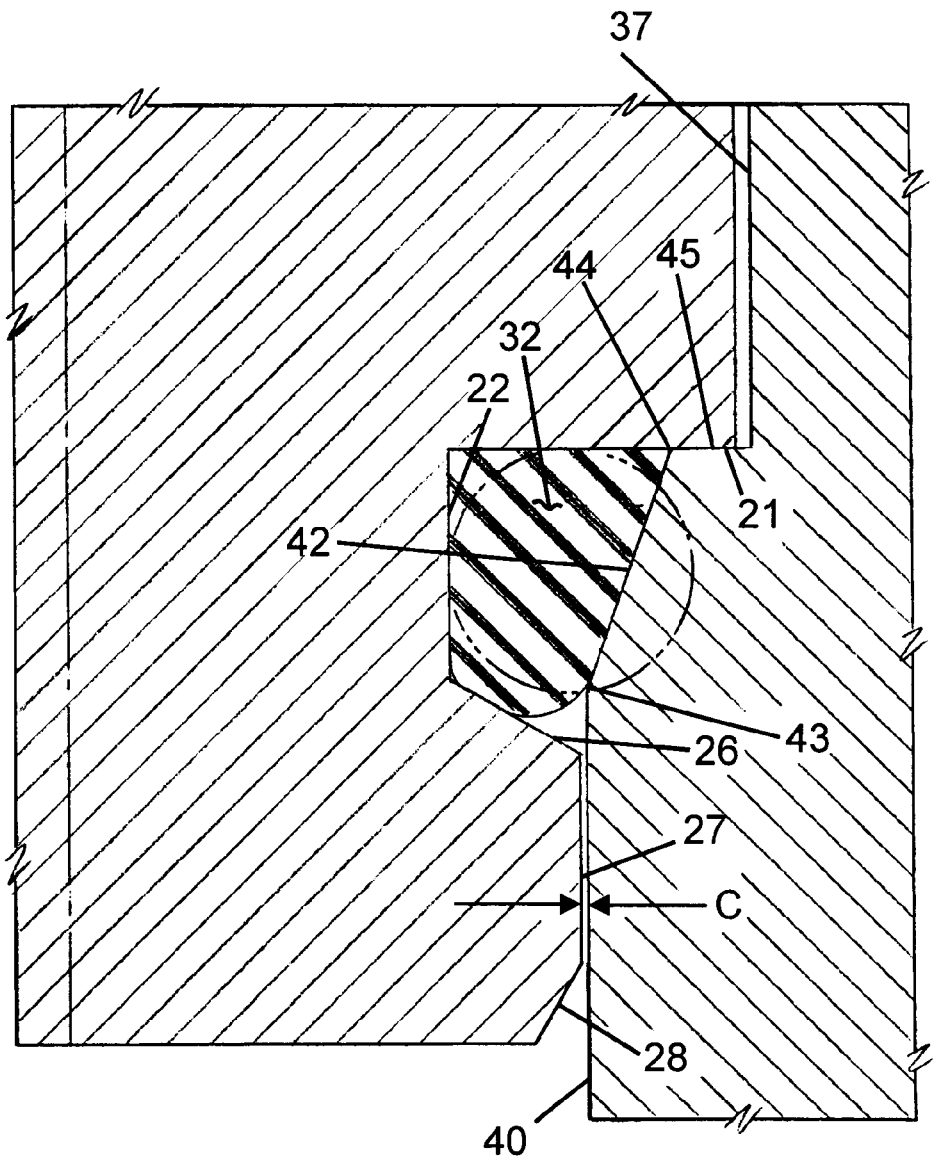

For assembly, guide seat section 24 vis-a-vis inner chamfered surface 28 positions guide portion 17 into smaller bore 40. As shown in FIG. 6, the spacing between cylindrical guide seat surface 27 and smaller diameter bore 40 as shown by radial dimension C, is relatively close, typically about 0.002" to about 0.006". This assures threaded engagement between threaded section 20 of plug 10 and internally threaded section 38 of counterbore 37 while plug dimensioning O-ring 32 within O-ring portion 15. Significantly, clearance "C" is sized to minimize any movement of O-ring 32 after assembly. Plug 10 is then threaded into counterbore 38 until plug annular seat surface 21 contacts annular port seat surface 45. As noted, plug 10 can be equipped with spacer section 16 which can have various configurations for maintaining the position of various components in the hydraulic passages of housing 33. For example, spacer 16 could maintain the position of a fiter 25 or a ball check (not shown) in a hydraulic passage 29 intersecting with smaller bore 40.

Figure 1:
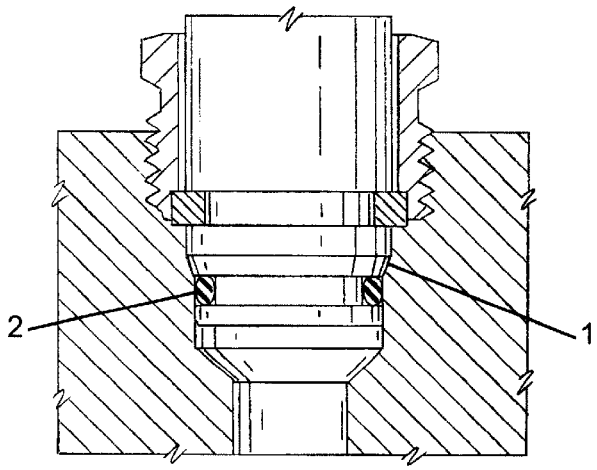
FIG. 1 is a prior art longitudinally sectioned view of a hydraulic coupling applied to a port.
Figure 2:
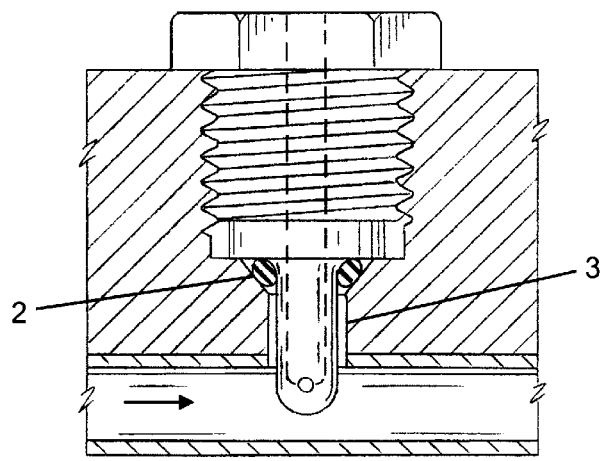
FIG. 2 is a prior art longitudinally sectioned view of a sensor plug applied to a port to measure temperature of gas flow in a conduit.
Figure 3:
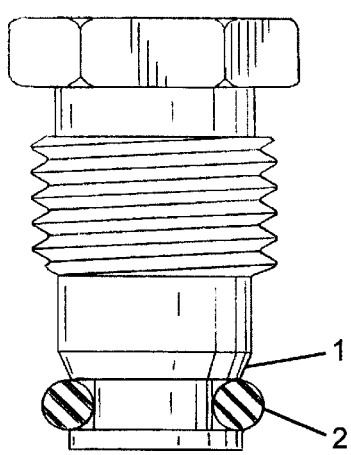
FIG. 3 is a longitudinal view of a prior art plug.

When plug 10 is torqued to specifications, seating surfaces 45 and 21 form a seal. By sizing the threaded connections and the area of the annular seating surfaces, positive sealing is assured over the entire annular seat area. Significantly, because of the perpendicular relationship of confronting annular seat surfaces 45, 21, the seating area is in compression so that the housing 33 is better able to resist distortion should plug 10 be torqued beyond specifications. That is, prior art illustrated in FIGS. 1 and 3 established shear stresses in the housing which are avoided in the present invention. Further, by placing seat surfaces 45, 21 in compression at specified torque levels, sealing is maintained throughout the seating area despite temperature variations, pressure variations or normal tolerance variations in perpendicularity of the surfaces while avoiding undue stresses on the threaded connection. By maintaining seat surfaces 45,21 in metal-to-metal contact, movement of O-ring into and out of any clearance in the seat surface which eventually will lead to failure is avoided.

Primary sealing of the plug/port assembly is caused to occur by compressing elastomer seal or O-ring 32. O-ring 32 is caused to deform both radially and longitudinally. Radial deformation occurs by forces exerted on O-ring 32 between O-ring cylindrical surface 22 and frusto conical bore 42. Longitudinal compression occurs as a result of chamfered seat surface 27 in combination with frusto conical bore 42, O-ring cylindrical surface 22 and plug annular seat surface 21. As already indicated, the dimensioning of frusto conical bore relative to guide portion 24, both longitudinally and radially as well as the angular relationships defined above insure the effectiveness of O-ring seal 32.

The invention has been described with reference to a preferred embodiment. Obviously, alterations and modifications will occurs to others skilled in the art upon reading and understanding the detailed description of the invention. For example, the plug/port combination will retain its high-pressure sealing capabilities if both plug and port were made of the same material or if the plug were made of softer material than the port as well as if the port were made of a softer material than the plug. Of course the plug/port assembly will seal at lower pressure. It is intended to include all such modifications and alterations insofar as they come within the scope of the present invention.

Having thus defined the invention, it is claimed:

1. A high pressure plug/port assembly for sealing fluids at pressures in excess of 4,000 psi comprising:

a) a cylindrical longitudinally extending plug having a cylindrical head portion at one end, a cylindrical guide portion at its opposite end and an O-ring portion between and contiguous with said head portion and said guide portion; said head portion having a fastener section at said one end for tightening said plug, an externally threaded section adjacent said fastener section, said fastener section extending to and terminating at an annular plug surface extending radially inwardly to said O-ring portion and perpendicular to the longitudinal axis of said plug; said O-ring portion smaller in outside diameter than said head portion and said guide portion and said guide portion smaller in outside diameter than said head portion; said guide portion having a chamfered surface extending radially inward to said O-ring portion whereat said guide portion is contiguous with said O-ring portion;

b) a high pressure port in a housing having a flat surface adjacent said fastener section; a threaded counterbore longitudinally extending in said housing from said flat surface in threaded engagement with said externally threaded plug section and terminating at an annular port seat surface extending radially inward and perpendicular to said threaded counterbore; a smaller bore having diameter larger than said guide portion by 0.004" to 0.012" and concentric with said counterbore; a frusto-conical surface having a major diameter adjacent said port seat surface and a minor diameter adjacent said smaller bore; said guide portion within said smaller bore when said plug is tightened; and, c) sealing means for sealing said port by said plug including i) an O-ring radially compressed between said frusto-conical surface and said O-ring portion and longitudinally compressed between said frusto-conical surface, said plug seating surface and said chamfered surface whereby said O-ring is maintained within said O-ring portion when said plug is tightened and ii) said plug and port seating surfaces in metal-to-metal compressive, deforming contact with one another.

2. The combination of claim 1 wherein said frusto conical surface forms an angle of about 10° to 30° with the longitudinal axis of said plug.

3. The combination of claim 2 wherein said chamfer forms an angle of about 30° to 45° with the longitudinal axis of said plug.

4. The combination of claim 3 wherein said port is formed in a body of material softer than the material of said plug whereby said body of softer material is deformed in compression when said plug is tightened.

* * * * *